United States Patent
Kim

(10) Patent No.: US 11,347,962 B2
(45) Date of Patent: May 31, 2022

(54) ELECTRONIC APPARATUS, METHOD FOR PROCESSING IMAGE AND COMPUTER-READABLE RECORDING MEDIUM

(71) Applicant: Samsung Electronics Co., Ltd., Suwon-si (KR)

(72) Inventor: Bongjoe Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 16/508,529

(22) Filed: Jul. 11, 2019

(65) Prior Publication Data
US 2020/0026952 A1    Jan. 23, 2020

(30) Foreign Application Priority Data
Jul. 17, 2018  (KR) ................. 10-2018-0083016

(51) Int. Cl.
| | | |
|---|---|---|
| G06K 9/46 | (2006.01) | |
| G06V 10/48 | (2022.01) | |
| G06K 9/62 | (2022.01) | |
| G06N 3/08 | (2006.01) | |
| G06T 7/00 | (2017.01) | |

(Continued)

(52) U.S. Cl.
CPC ......... *G06K 9/4633* (2013.01); *G06K 9/6255* (2013.01); *G06N 3/082* (2013.01); *G06T 7/001* (2013.01); *G06V 10/454* (2022.01); *G06V 10/757* (2022.01); *G06V 30/194* (2022.01);

(Continued)

(58) Field of Classification Search
CPC combination set(s) only.
See application file for complete search history.

(56) References Cited

U.S. PATENT DOCUMENTS

| 9,542,621 B2 * | 1/2017 | He ...................... G06V 30/194 |
|---|---|---|
| 10,303,977 B2 * | 5/2019 | Wshah ................. G06V 20/593 |

(Continued)

FOREIGN PATENT DOCUMENTS

| JP | 2016-146174 | 8/2016 |
|---|---|---|
| KR | 10-2016-0069834 | 6/2016 |

(Continued)

OTHER PUBLICATIONS

Kaiming He, et al. "Spatial Pyramid Pooling in Deep Convolutional Networks for Visual Recognition", Apr. 2015, 14 pages.

(Continued)

*Primary Examiner* — Tsung Yin Tsai
(74) *Attorney, Agent, or Firm* — Staas & Halsey LLP

(57) ABSTRACT

The disclosure relates to an artificial intelligence (AI) system utilizing a machine learning algorithm, and application thereof. In particular, an electronic apparatus according to the disclosure includes a memory storing a trained artificial intelligence model, and a processor configured to acquire a plurality of feature values by inputting an input image to the artificial intelligence model. The trained artificial intelligence model applies each of a plurality of filters to a plurality of feature maps extracted from the input image and includes a pooling layer for acquiring feature values for the plurality of feature maps to which each of the plurality of filters is applied.

20 Claims, 10 Drawing Sheets

(51) Int. Cl.
*G06V 10/44* (2022.01)
*G06V 10/75* (2022.01)
*G06V 30/194* (2022.01)

(52) U.S. Cl.
CPC ............... *G06T 2207/20081* (2013.01); *G06T 2207/20084* (2013.01)

(56) References Cited

U.S. PATENT DOCUMENTS

| | | | | |
|---|---|---|---|---|
| 10,555,779 | B2* | 2/2020 | Kemp | A61B 5/062 |
| 10,558,885 | B2* | 2/2020 | Kim | G06V 30/194 |
| 10,650,508 | B2* | 5/2020 | Chang | G06N 3/0454 |
| 2011/0131158 | A1* | 6/2011 | Furukawa | G06N 20/20 |
| | | | | 706/12 |
| 2016/0104058 | A1* | 4/2016 | He | G06K 9/6255 |
| | | | | 382/156 |
| 2016/0162782 | A1 | 6/2016 | Park | |
| 2016/0163035 | A1* | 6/2016 | Chang | G06N 3/0454 |
| | | | | 382/149 |
| 2017/0220891 | A1* | 8/2017 | Kim | G06K 9/6255 |
| 2017/0372174 | A1* | 12/2017 | Wshah | G06V 20/593 |
| 2018/0181838 | A1 | 6/2018 | Yang | |
| 2018/0181858 | A1* | 6/2018 | Son | G06N 3/0445 |
| 2019/0328461 | A1* | 10/2019 | Kemp | G16H 20/40 |
| 2020/0026952 | A1* | 1/2020 | Kim | G06V 10/48 |

FOREIGN PATENT DOCUMENTS

| | | |
|---|---|---|
| KR | 10-2017-0091716 | 8/2017 |
| KR | 10-1854258 | 5/2018 |
| WO | 2016/054779 | 4/2016 |
| WO | 2016/141282 | 9/2016 |
| WO | WO-2016141282 A1 * | 9/2016 |

OTHER PUBLICATIONS

International Search Report and Written Opinion of the International Searching Authority dated Oct. 25, 2019 in International Patent Application No. PCT/KR2019/008794.

Extended European Search Report dated Apr. 23, 2021 in European Patent Application No. 19838076.8.

Arulkumar Subramaniam et al., "NCC-Net: Normalized Cross Correlation Based Deep Matcher with Robustness to Illumination Variations", 2018 IEEE Winter Conference on Applications of Computer Vision, Mar. 2018, XP033337820, 10 pages.

* cited by examiner

FIG. 4
(a)
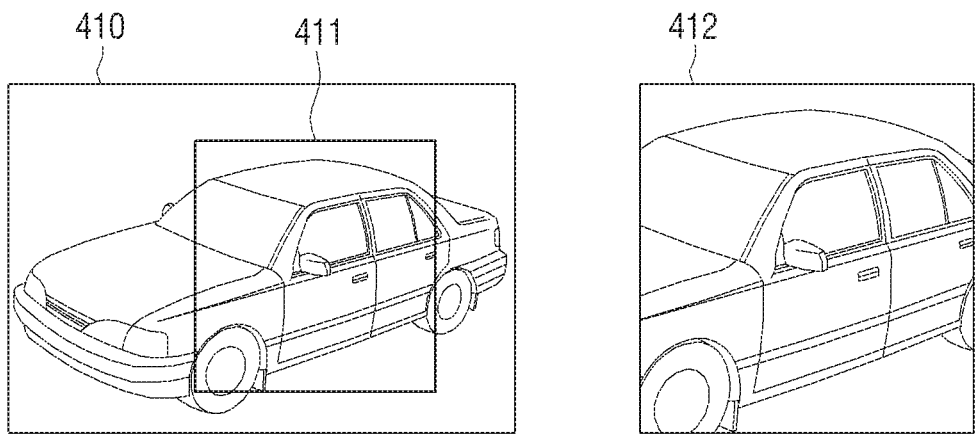
(b)
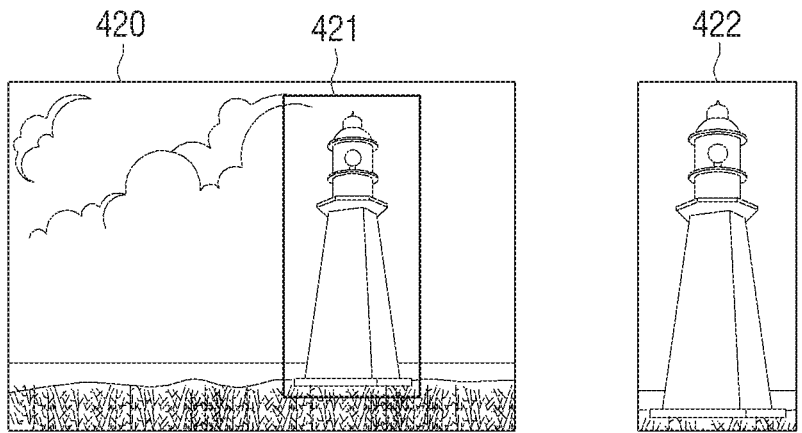

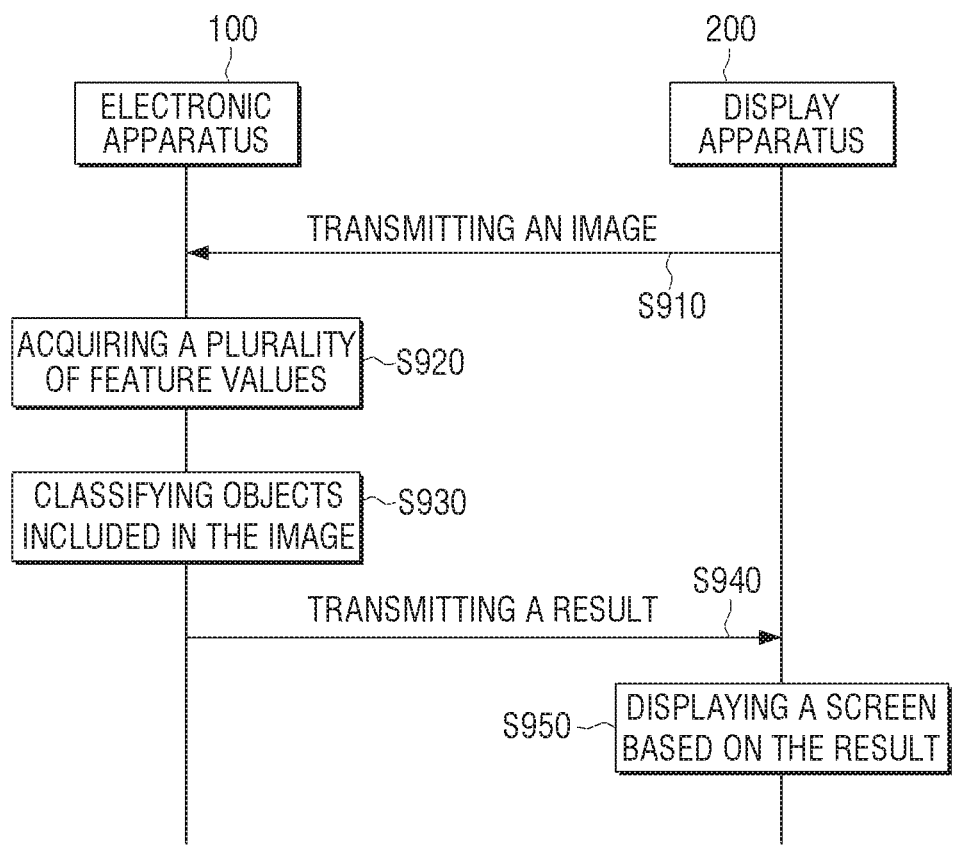

ELECTRONIC APPARATUS, METHOD FOR PROCESSING IMAGE AND COMPUTER-READABLE RECORDING MEDIUM

CROSS-REFERENCE TO RELATED APPLICATION(S)

This application is based on and claims priority under 35 U.S.C. § 119(a) of a Korean patent application number 10-2018-0083016, filed on Jul. 17, 2018, in the Korean Intellectual Property Office, the disclosure of which is incorporated by reference herein in its entirety.

BACKGROUND

1. Field

The disclosure relates to an electronic apparatus, a method for processing an image, and a computer-readable recording medium, and more particularly, to an electronic apparatus for extracting a feature of which performance has been further improved from an input image, a method for processing an image, and a computer-readable recording medium.

2. Description of Related Art

An artificial intelligence system is a computer system implementing intelligence of a human level, and it is a system wherein a machine learns and determines by itself, and which shows a more improved recognition rate as it is used more.

An artificial intelligence technology consists of a machine learning (deep learning) technology using an algorithm of classifying/learning the features of input data by itself, and element technologies of simulating functions of a human brain such as cognition and determination by using a machine learning algorithm.

Element technologies may include at least one of, for example, a linguistic understanding technology of recognizing languages/characters of humans, a visual understanding technology of recognizing an object in a similar manner to human vision, an inference/prediction technology of determining information and then making logical inference and prediction, a knowledge representation technology of processing information of human experiences into knowledge data, autonomous driving of vehicles, or an operation control technology of controlling movements of robots.

In particular, in order to extract a feature of an image by using an artificial intelligence model, an image in a fixed size had to be input to an artificial intelligence model, and thus there was a problem that the resolution of an image is reduced and the ratio of an image is changed.

Accordingly, a need for a technology for extracting a feature of an image without being influenced by the size of an input image arose.

SUMMARY

The disclosure relates to an electronic apparatus, a method for processing an image, and a computer-readable recording medium, and more particularly, to an electronic apparatus for extracting a feature of which performance has been further improved from an input image by using a normalized cross correlation (NCC) pooling layer, a method for processing an image, and a computer-readable recording medium.

An electronic apparatus according to the disclosure includes a memory storing a trained artificial intelligence model, and a processor configured to acquire a plurality of feature values by inputting an input image to the artificial intelligence model. The trained artificial intelligence model applies each of a plurality of filters to a plurality of feature maps extracted from the input image and includes a pooling layer for acquiring feature values for the plurality of feature maps to which each of the plurality of filters has been applied.

In this case, the plurality of filters may be respectively applied to the entire area of the plurality of feature maps.

Meanwhile, the plurality of filters may be updated based on the acquired feature values and the input image.

Also, the feature values may be acquired based on similarity between each of the plurality of feature maps and the plurality of filters.

Meanwhile, the pooling layer may further include a Relu layer through which the plurality of feature maps to which each of the plurality of filters is applied pass.

In this case, the feature values may be acquired as average values of each of the plurality of feature maps that passed through the Relu layer.

Meanwhile, the plurality of feature maps may be extracted by using a convolution layer included in the trained artificial intelligence model.

Also, the number of the plurality of filters may be identified based on the number of the plurality of feature maps and the number of the plurality of feature values.

Further, the processor may classify objects included in the input image based on the acquired feature values.

Meanwhile, a method for processing an image according to an embodiment of the disclosure may include the steps of receiving input of an image and acquiring a plurality of feature values by inputting the input image to a trained artificial intelligence model. The trained artificial intelligence model may apply each of a plurality of filters to a plurality of feature maps extracted from the input image and include a pooling layer for acquiring feature values for the plurality of feature maps to which each of the plurality of filters has been applied.

In this case, the plurality of filters may be respectively applied to the entire area of the plurality of feature maps.

Meanwhile, the plurality of filters may be updated based on the acquired feature values and the input image.

Also, the feature values may be acquired based on similarity between each of the plurality of feature maps and the plurality of filters.

Meanwhile, the pooling layer may further include a Relu layer through which the plurality of feature maps to which each of the plurality of filters is applied pass.

In this case, the feature values may be acquired as average values of each of the plurality of feature maps that passed through the Relu layer.

Meanwhile, the plurality of feature maps may be extracted by using a convolution layer included in the trained artificial intelligence model.

Also, the number of the plurality of filters may be identified based on the number of the plurality of feature maps and the number of the plurality of feature values.

In addition, the method for processing an image according to an embodiment of the disclosure may further include the step of classifying objects included in the input image based on the acquired feature values.

Meanwhile, in a non-transitory computer-readable recording medium including a program for executing a method for processing an image according to an embodiment of the disclosure, the method for processing an image may include the steps of receiving input of an image, and acquiring a plurality of feature values by inputting the input image to a trained artificial intelligence model. The trained artificial intelligence model may apply each of a plurality of filters to a plurality of feature maps extracted from the input image and include a pooling layer for acquiring feature values for the plurality of feature maps to which each of the plurality of filters has been applied.

BRIEF DESCRIPTION OF THE DRAWINGS

FIG. 4 is a diagram for illustrating a conventional technology related to a technology of extracting a feature;

FIG. 10 is a flow chart for illustrating a method for processing an image according to another embodiment of the disclosure.

DETAILED DESCRIPTION

Figure 1:
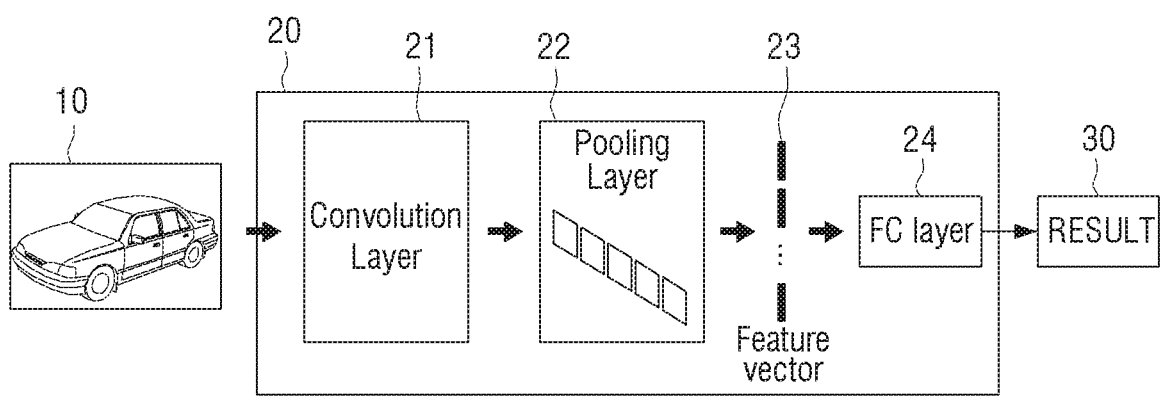
FIG. 1 is a diagram for schematically illustrating a process of processing an image of an electronic apparatus according to an embodiment of the disclosure.

Hereinafter, terms used in this specification will be described briefly, and then the disclosure will be described in detail.

As terms used in the embodiments of the disclosure, general terms that are widely used currently were selected as much as possible, in consideration of the functions described in the disclosure. However, the terms may vary depending on the intention of those skilled in the art who work in the pertinent field, previous court decisions or emergence of new technologies. Also, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed explanation of related known technologies may confuse the gist of the disclosure, the detailed explanation will be omitted.

In addition, the terms "first," "second" and the like may be used to describe various elements, but the terms are not intended to limit the elements. Such terms are used only to distinguish one element from another element.

Meanwhile, singular expressions also include plural expressions as long as they do not mean obviously differently in the context. In addition, in this specification, terms such as "include" and "consist of" should be construed as designating that there are such characteristics, numbers, steps, operations, elements, components or a combination thereof in the specification, but not to exclude in advance the existence or possibility of adding one or more of other characteristics, numbers, steps, operations, elements, components or a combination thereof.

Further, 'a module' or 'a part' in the embodiments of the disclosure perform at least one function or operation, and these elements may be implemented as hardware or software, or as a combination of hardware and software. Also, a plurality of 'modules' or 'parts' may be integrated into at least one module and implemented as at least one processor, except 'modules' or 'parts' that need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, the disclosure will be described in more detail with reference to the drawings.

FIG. 1 is a diagram for schematically illustrating a process of processing an image of an electronic apparatus according to an embodiment of the disclosure.

Referring to FIG. 1, when an input image 10 is input to an electronic apparatus, the electronic apparatus may output a result 30 after going through a series of processes of processing an image. Here, the result 30 may be classification of objects included in the input image 10, a high resolution image wherein the image quality of the input image 10 has been improved, etc., depending on the purpose of processing an image.

Here, the electronic apparatus may include an artificial intelligence model 20 which is capable of artificial intelligence learning. For example, the electronic apparatus may be a desktop PC, a laptop computer, a smartphone, a tablet PC, a server, etc. Alternatively, the electronic apparatus may mean a system itself wherein a clouding computing environment has been constructed. However, the electronic apparatus is not limited thereto, and any apparatus which is capable of artificial intelligence learning may be the electronic apparatus.

Specifically, the artificial intelligence model 20 included in the electronic apparatus may include a plurality of layers 21, 22 for extracting features of the input image 10. Here, the artificial intelligence model 20 includes a convolution layer, and it may be a convolution neural network for recognizing an image. Also, the electronic apparatus may make the input image 10 pass through the plurality of layers 21, 22 and acquire a feature vector 23 according to the purpose of processing an image. Here, the feature vector 23 is the number of features required depending on the purpose of processing an image, and may be a predetermined number to correspond to the purpose, and may have been input by a user.

Specifically, the input image 10 may be input to a convolution layer 21 included in the artificial intelligence model 20. Here, the convolution layer 21 may extract a plurality of features maps that extracted features of the input image 10 by using a plurality of filters.

Here, a filter is a mask having weights, and is defined as a matrix of weights. A filter may also be referred to as windows or a kernel. In a filter, weights constituting a matrix consist of a zero element which is 0 (a zero value) or may be approximated to 0 and a non-zero element having a specific value between 0 and 1, and may have different patterns according to their functions.

Taking as an example a case wherein the artificial intelligence model 20 is implemented as a convolution neural network (hereinafter, referred to as a CNN) for recognizing an image, the electronic apparatus may cover the input image 10 with a filter having weights, and determine a sum of respective multiplied values of the weights of the image and the weights of the filter (a convolution operation) as the pixel value of an output image, and extract a feature map. The input image may be output as a plurality of images through multiple filters for extracting strong features, and depending on the number of the filters, a plurality of feature maps may be extracted. A convolution image as above may be repeated by multiple layers. Here, filters learned vary depending on the subject to be learned by the CNN, and the patterns of filters selected also vary. For example, filters learned and filters selected vary depending on what is the subject to be learned by the CNN, such as a cat, a puppy, a pig, a cow, etc.

As described above, the artificial intelligence model 20 may combine convolution layers 21 that are capable of extracting different features and apply the layers, and thereby determine what kinds of forms of features the original data input have.

Also, the artificial intelligence model 20 may include a pooling layer 22 that sub samples a plurality of feature maps extracted through the convolution layers 21 depending on needs. Here, the pooling layer 22 may acquire the feature vector 23 by applying each of the plurality of filters to the plurality of feature maps. Meanwhile, the filters of the pooling layer 22 may be learned by the neural network. Also, the plurality of filters may be respectively applied to the entire area of the plurality of feature maps. For example, if the number of the plurality of feature maps is N, and the number of the filters included in the pooling layer 22 is M, the size of the acquired feature vector 23 may be M*N.

Here, the feature vector 23 corresponding to the purpose of processing an image may be acquired by adjusting the number of the plurality of feature maps and the number of the filters of the pooling layer 22. A detailed process of processing an image at the pooling layer 22 will be described in detail with reference to FIG. 6 below.

Further, the electronic apparatus may output a result 30 value by making the acquired feature vector 23 pass through a fully connected (FC) layer 24. Specifically, the electronic apparatus may input the acquired feature vector 23 to an FC layer 24 constructed as a conventional neural network and output the result 30 of image processing the input image 10. For example, the electronic apparatus may output a result of detecting objects included in the input image 10, a result of classifying the types of objects, and a result of improving the image quality of the input image 10, depending on the purpose of processing an image.

Figure 2:
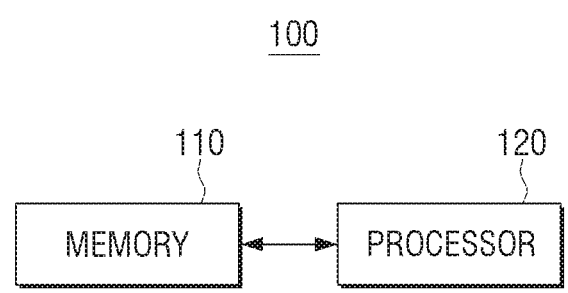
FIG. 2 is a block diagram for illustrating a schematic configuration of an electronic apparatus according to an embodiment of the disclosure.

FIG. 2 is a block diagram for illustrating a schematic configuration of an electronic apparatus according to an embodiment of the disclosure.

Referring to FIG. 2, the electronic apparatus 100 may include a memory 110 and a processor 120.

The memory 110 may store various types of programs and data necessary for the operations of the electronic apparatus 100. Specifically, the memory 110 may store at least one instruction. The processor 120 may perform the aforementioned operations by executing the instructions stored in the memory 110. The memory 110 may be implemented as a non-volatile memory, a volatile memory, a flash-memory, a hard disc drive (HDD) or a solid state drive (SSD), etc.

Also, the memory 110 may store a trained artificial intelligence model. Here, the trained artificial intelligence model may include a pooling layer for acquiring feature values by applying each of the plurality of filters to the plurality of feature maps extracted from the convolution layers.

Here, the plurality of filters may be respectively applied to the entire area of the plurality of feature maps. That is, according to the disclosure, it is not that a plurality of feature maps are divided and different feature values are acquired for each divided area, but feature values for the entire area of the feature maps may be extracted.

Also, feature values acquired by applying each of the plurality of filters to the plurality of feature maps may be acquired based on similarity between each of the plurality of feature maps and the plurality of filters. Specifically, filters detect whether a feature is included in data or not, and the processor 120 may divide a feature map into a plurality of areas having the sizes of the filters, and apply the filters to all of the areas.

Meanwhile, the pooling layer further includes a Relu layer through which the plurality of feature maps to which each of the plurality of filters has been applied pass. The Relu layer is for changing whether a feature of a filter is included in data or not to a nonlinear value indicating whether a feature of a filter 'exists' or 'does not exist.' A function used in such a process may also be referred to as an activation function. A sigmoid function is also used as such an activation function, but learning becomes more difficult for a sigmoid function as the neural network becomes deeper, and thus a Relu layer is used instead.

Also, an average value of values of each of the plurality of feature maps that passed through the Relu layer may be acquired as a feature value corresponding to each feature map. In the disclosure, it was described that an average value of values constituting feature maps is acquired as a feature value corresponding to feature maps. However, depending on the embodiments, the biggest value among values constituting feature maps may be acquired as a feature value corresponding to feature maps. A process of deriving a feature value according to the disclosure as described above will be described in more detail with reference to FIG. 6 below.

Further, the plurality of filters may be updated based on the feature values acquired as the feature maps passed through the pooling layer and the input image. Specifically, the plurality of filters may be updated based on the acquired feature values such that the performance of the artificial intelligence model is improved. For example, if the purpose of the artificial intelligence model is classifying the types of objects included in the input image, the feature values acquired by the artificial intelligence model may be input to the FC layer and the acquired result may be compared with the types of objects actually included in the input image. Then, the plurality of filters may be updated according to the result of comparison such that the performance of the artificial intelligence model is improved. Such an updating operation may be performed by the processor 120.

The processor 120 controls the overall operations of the electronic device 100.

According to an embodiment of the disclosure, the processor 120 may be implemented as a digital signal processor (DSP), a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP) or a communication processor (CP), and an ARM processor, or may be defined by the terms. Also, the processor 120 may be implemented as a system on chip (SoC) having a processing algorithm stored therein or large scale integration (LSI), or in the form of a field programmable gate array (FPGA).

Specifically, the processor 120 may acquire a plurality of feature values for the input image by inputting the input image to the artificial intelligence model of the memory 110. The operations of the artificial intelligence model in the disclosure may be performed by the control of the processor 120.

Then, the processor 120 may perform various operations depending on the purpose of the artificial intelligence model stored in the memory 110.

Specifically, if the artificial intelligence model is related to image recognition, visual understanding is a technology of recognizing an object in a similar manner to human vision and processing the object, and the processor 120 may perform recognition of objects in the input image, tracking of objects, search of images, recognition of people, understanding of scenes, understanding of spaces, improvement of images, etc. through the artificial intelligence model.

Meanwhile, if the artificial intelligence model is related to recommendation of information, inference/prediction is a technology of determining information and then making logical inference and prediction, and the processor 120 may perform knowledge/probability based inference, optimization prediction, preference based planning, recommendation, etc.

In addition, if the artificial intelligence model is related to processing of a query, knowledge representation is a technology of automatically processing information of human experiences into knowledge data, and the processor 120 may perform knowledge construction (data generation/classification), knowledge management (data utilization), etc.

As described above, by acquiring feature values in a predetermined number by applying each of a plurality of filters to a plurality of feature maps for an input image, a CNN technology may be applied without a limitation in the size of the input image. Also, as filters are learned, performance can be improved.

Figure 3:
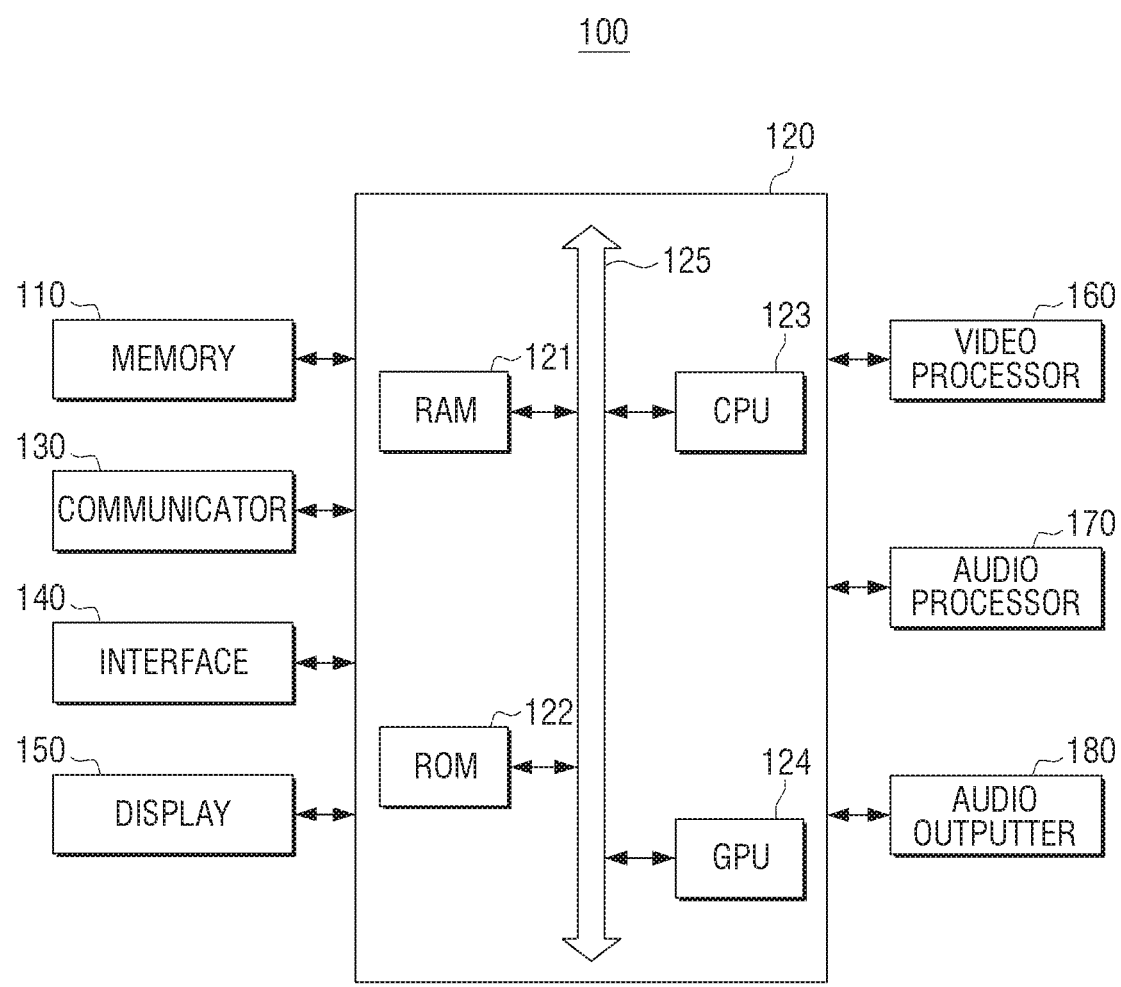
FIG. 3 is a block diagram for illustrating a detailed configuration of the electronic apparatus illustrated in FIG. 2.

FIG. 3 is a block diagram for illustrating a detailed configuration of the electronic apparatus illustrated in FIG. 2.

Referring to FIG. 3, the electronic apparatus 100 may include a memory 110, a processor 120, a communicator 130, an interface 140, a display 150, a video processor 160, an audio processor 170, an audio outputter 180, etc.

Here, as the memory 110 and the processor 120 are identical to the components illustrated in FIG. 2, overlapping descriptions will be omitted.

The communicator 130 is a component that performs communication with various types of external apparatuses according to various types of communication methods. The electronic apparatus 100 may perform communication through a wired or wireless method from an external apparatus. Hereinafter, in the disclosure, for the convenience of explanation, a case wherein communication is performed by a wireless method will be described as a case wherein communication is performed by the communicator 130, and a case wherein communication is performed by a wired method will be described as a case wherein communication is performed by the interface 140.

Specifically, the communicator 130 may receive input of an image from an external apparatus through a wireless method such as Wi-Fi and Bluetooth. Meanwhile, in actual implementation, the electronic apparatus 100 may receive input of an image selected by a user among a plurality of images stored in the memory 110 provided on the electronic apparatus 100, and perform image processing on the images.

In case the electronic apparatus 100 is capable of wireless communication, the communicator 130 may include a Wi-Fi chip, a Bluetooth chip, a wireless communication chip, and an NFC chip. Specifically, a Wi-Fi chip and a Bluetooth chip perform communication by a Wi-Fi method and a Bluetooth method, respectively. In the case of using a Wi-Fi chip or a Bluetooth chip, various types of connection information such as an SSID and a session key is transmitted and received first, and connection of communication is performed by using the information, and various types of information can be transmitted and received thereafter. A wireless communication chip refers to a chip performing communication according to various communication standards such as IEEE, Zigbee, 3rd Generation (3G), 3rd Generation Partnership Project (3GPP), and Long Term Evolution (LTE). Meanwhile, an NFC chip refers to a chip that operates in a near field communication (NFC) method using a 13.56 MHz band among various RF-ID frequency bands such as 135 kHz, 13.56 MHz, 433 MHz, 860-960 MHz, and 2.45 GHz.

Specifically, the electronic apparatus 100 may receive image data from an external apparatus through the communicator. For example, in case the electronic apparatus 100 is a display apparatus such as a TV, it may receive an image from a server of a broadcasting station and a server of an external source, and acquire the feature values of the received image by the processor 120.

Meanwhile, if the electronic apparatus 100 is a server communicating with an external display apparatus, the electronic apparatus 100 may receive an input image from the external display apparatus through the communicator 130. The processor 120 may input the received input image to the artificial intelligence model and acquire a result for the input image, and transmit the acquired result to the external display apparatus through the communicator 130.

The interface 140 is a component for connecting the electronic apparatus 100 with an external apparatus through a wired method. Specifically, the interface 140 may input and output at least one of an audio signal or a video signal through a wired method like a cable or a port.

Here, the interface 140 may be at least one of a Display Port (DP), a High Definition Multimedia Interface (HDMI), a Digital Visual Interface (DVI), a Red Green Blue (RGB), a DSUB, a Super Video (S-Video), a Component Video, a Composite Video, a USB, or a port in a Thunderbolt method.

The display 150 may display a received image. Here, an image displayed by the display 150 may be an image of which image quality has been improved by a trained artificial intelligence model. Meanwhile, depending on the purpose of the artificial intelligence model, objects included in the image may be displayed together on the display 150, and the types of the objects may also be displayed together.

The display 150 may be implemented as various forms of displays such as a Liquid Crystal Display (LCD), an Organic Light Emitting Diodes (OLED) Display, a Plasma Display Panel (PDP), etc. In the display 150, driving circuits that may be implemented in forms such as an a-si TFT, a low temperature poly silicon (LTPS) TFT, an organic TFT (OTFT) and the like, a backlight unit, etc. may also be included together. In addition, the display 150 may also be implemented as a flexible display.

Further, the display 150 may include a touch sensor for detecting a touch gesture of a user. A touch sensor may be implemented as various types of sensors such as an electrostatic type, a resistive type, a piezoelectric type, etc. An electrostatic type is a type of calculating a touch coordinate by detecting micro electricity excited to the body of a user when a part of the body of a user touches the surface of the display 150 by using a dielectric material coated on the surface of the display. A resistive type is a type wherein two electrode plates accommodated in the display 150 are included, and in case a user touches the screen, it is detected that the upper and lower plates at the touched point contact each other and currents flow, and a touch coordinate is thereby calculated. In addition to the above, in case the electronic apparatus 100 supports a pen input function, the display 150 can detect a user gesture using an input means like a pen, other than a user's finger. In case the input means is a stylus pen including a coil in its inside, the electronic apparatus 100 may include a magnetic field detection sensor that can detect a magnetic field changed by the coil in the stylus pen. Accordingly, not only a touch gesture, but also a proximate gesture, i.e., hovering can be detected.

Meanwhile, so far, it was described that a display function and a gesture detection function are performed at the same component, but they may be implemented at different components. Also, depending on the various embodiments, the display 150 may not be provided on the electronic apparatus 100. For example, in case the electronic apparatus 100 is a server, the display 150 may not be provided. In this case, an input image or a processed image may be transmitted to and received from an external display apparatus through the communicator 130 or the interface 140.

The processor 120 may include a RAM 121, a ROM 122, a CPU 123, a graphic processing unit (GPU) 124, and a bus 125. The RAM 121, the ROM 122, the CPU 123, the graphic processing unit (GPU) 124, etc. may be connected to one another through the bus 125.

The CPU 123 accesses the memory 110, and performs booting by using the O/S stored in the memory 110. Then, the CPU 123 performs various operations by using various types of programs, contents, data, etc. stored in the memory 110.

The ROM 122 stores a set of instructions, etc. for system booting. When a turn-on instruction is input and power is supplied, the CPU 123 copies the O/S stored in the memory 110 in the RAM 121 according to the instruction stored in the ROM 122, and boots the system by executing the O/S. When booting is completed, the CPU 123 copies the various types of programs stored in the memory 110 in the RAM 121, and performs various types of operations by executing the programs copied in the RAM 121.

When booting of the electronic apparatus 100 is completed, the GPU 124 displays a UI on the display 150. Specifically, the GPU 124 may generate a screen including various objects like icons, images, texts, etc. by using an operation part (not shown) and a rendering part (not shown). The operation part operates attribute values such as coordinate values, shapes, sizes, colors, etc. by which each object will be displayed according to the layout of the screen. Also, the rendering part generates screens in various layouts including objects, based on the attribute values operated at the operation part. The screens (or user interface windows) generated at the rending part are provided to the display 150, and are respectively displayed in a main display area and a sub display area.

The video processor 160 is a component for processing a content received through the communicator 130 or the interface 140, or video data included in a content stored in the memory 110. At the video processor 160, various types of image processing such as decoding, scaling, noise filtering, frame rate conversion, resolution conversion, etc. of video data may be performed.

The audio processor 170 is a component for processing a content received through the communicator 130 or the interface 140, or audio data included in a content stored in the memory 110. At the audio processor 170, various types of processing such as decoding or amplification, noise filtering etc. of audio data may be performed.

When a reproduction application for a multimedia content is executed, the processor 120 may reproduce the content by operating the video processor 160 and the audio processor 170. Here, the display 150 may display an image frame generated at the video processor 160 in at least one of a main display area or a sub display area.

Meanwhile, so far, it was described that the processor 120, the video processor 160, and the audio processor 170 are separate components, but depending on the embodiments, they may be implemented as one chip. For example, the processor 120 may perform all of the operations of the video processor 160 and the audio processor 170.

The audio outputter 180 outputs audio data generated at the audio processor 170.

In addition to the above, depending on the embodiments, the electronic apparatus 100 can obviously further include in its inside various external input ports for connecting to various external terminals such as a headset and a mouse, a DMB chip that receives a Digital Multimedia Broadcasting (DMB) signal and processes the signal, a button for receiving input of a user's manipulation, a microphone that receives input of a user's voice and sound and converts it to audio data, a photographing part for photographing a still mage or a video according to a user's control, various sensors, etc., although they are not illustrated in FIG. 3.

Figure 5:
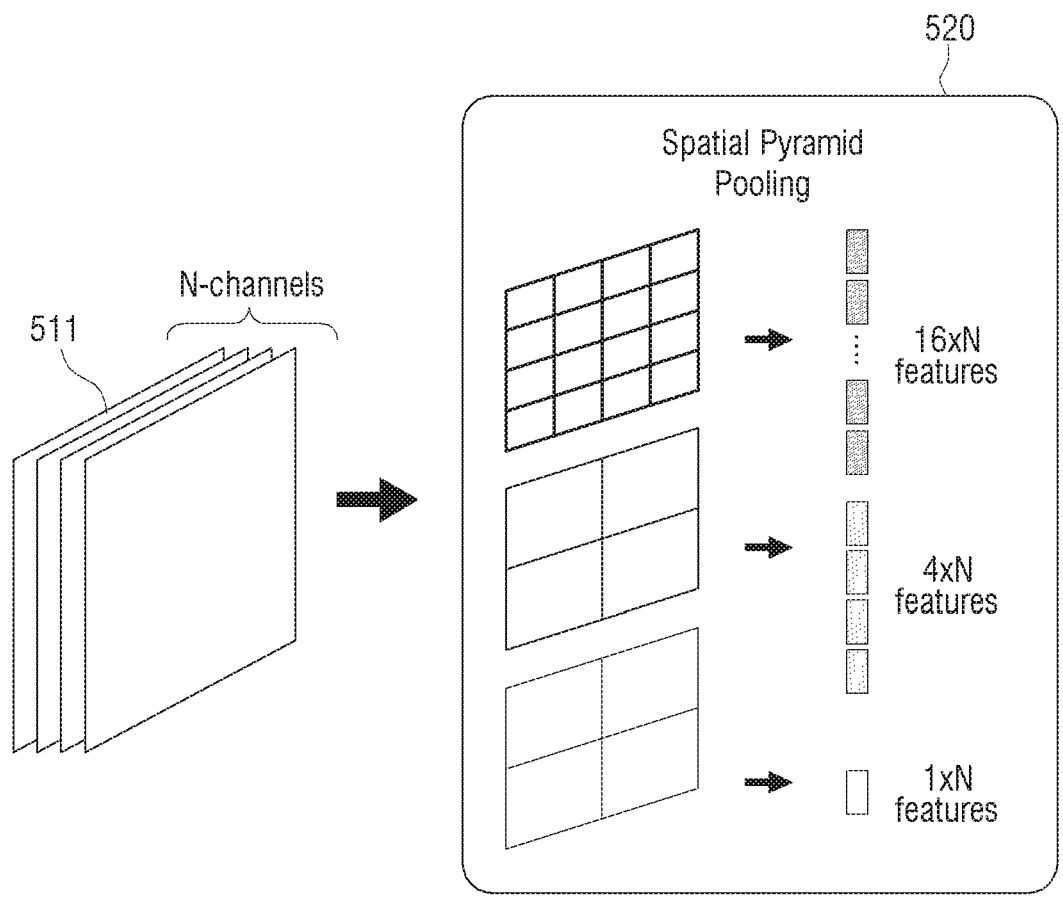
FIG. 5 is a diagram for illustrating a conventional technology related to a technology of extracting a feature.

FIGS. 4 and 5 are diagrams for explaining a conventional technology related to a technology of extracting a feature. Specifically, in a conventional technology, for acquiring a feature vector in a fixed size, a method of converting an input image to a fixed size as illustrated in FIG. 4 or a method of dividing a feature map into various sizes, and extracting a feature value for each divided area as illustrated in FIG. 5 was used.

Referring to FIG. 4, in a conventional technology, for extracting a feature vector in a fixed size, a method of cropping an area 411 of an input image 410 and enlarging the area to an area 412 in a fixed size as illustrated in FIG. 4(A), or a method of cropping a desired area 421 of an input image 420 and warping the area to an area 422 in a fixed size as illustrated in FIG. 4(B) was used. In this case, there was a problem that the resolution of an image is reduced, and the proportion of an image is changed.

Meanwhile, the method illustrated in FIG. 5 is for overcoming the problem in FIG. 4, and in the method, an input image is also used, but a spatial pyramid pooling (SPP) layer dividing each of a plurality of feature maps 511 of an input image in various scales is further included.

Referring to FIG. 5, when an input image is made to pass through a convolution layer and feature maps in an N number are acquired, the electronic apparatus may divide each feature map in various scales (e.g., 4×4, 2×2, 1×1, etc.), and acquire a representative value of each divided area, and thereby acquire a feature vector in a fixed size. Here, a representative value may be the maximum value of each divided area.

In this method, all feature maps are partitioned into specific divided areas, and thus there is a problem that an advantage of variable application by learning cannot be sufficiently reflected.

Figure 6:
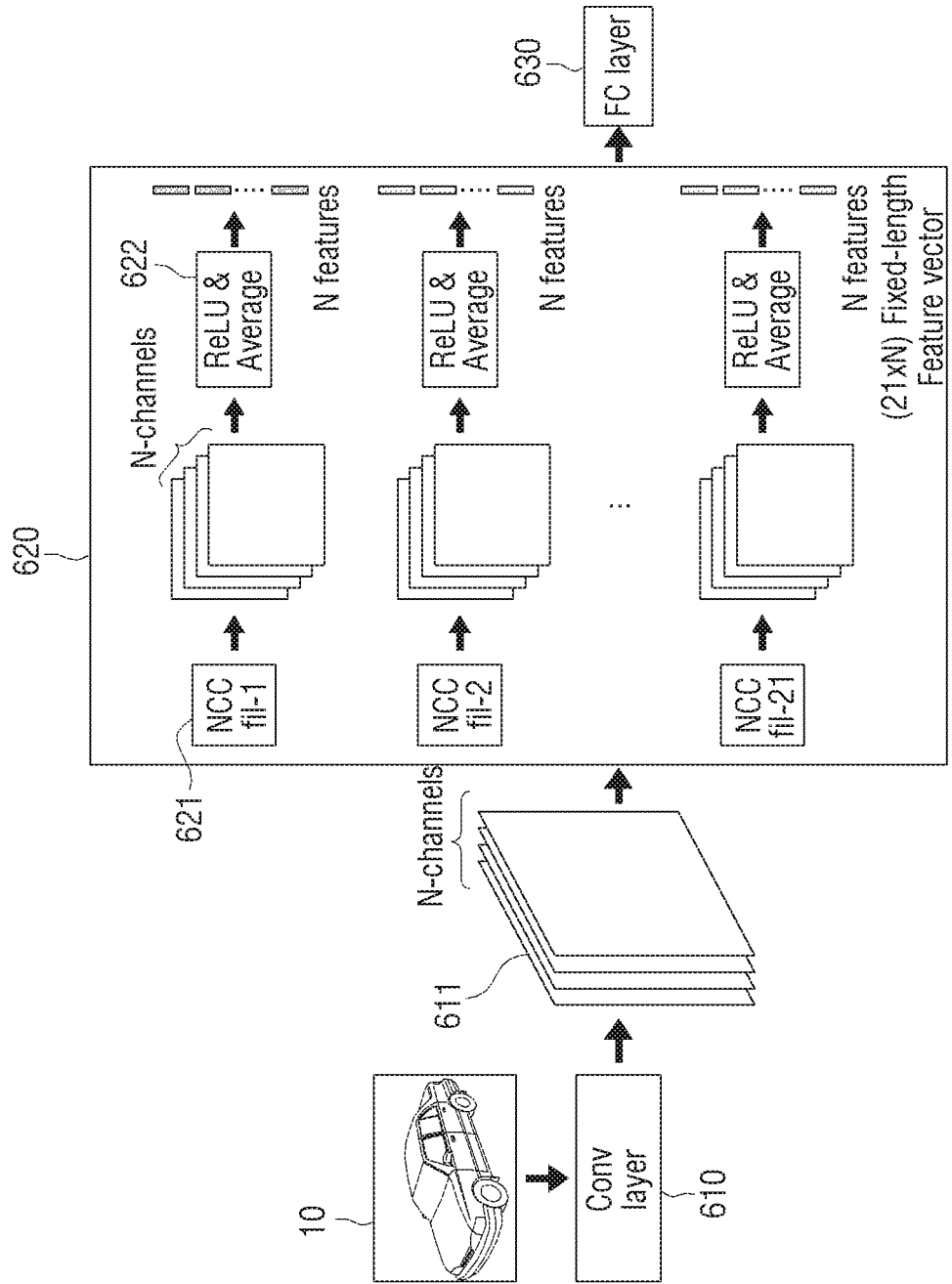
FIG. 6 is a diagram for illustrating in detail a method for processing an image according to an embodiment of the disclosure.

FIG. 6 is a diagram for illustrating in detail a method for processing an image according to an embodiment of the disclosure.

Referring to FIG. 6, first, an input image 10 is input to a convolution layer 610, and a plurality of feature maps 611 for the input image 10 may be extracted. For example, the plurality of feature maps 611 may consist of channels in an N number.

Then, the plurality of feature maps 611 may be input to a pooling layer 620 for extracting feature values for the input image 10. The pooling layer 620 may be disposed between the convolution layer 610 and an FC layer 630 which are components of a CNN which is a conventional artificial intelligence learning model.

Here, the pooling layer 620 may include a plurality of filters 621 defined by learning, and also, a Relu and average layer 622 for acquiring feature values from feature maps to which the plurality of filters have been applied.

Specifically, at the pooling layer 620, filters in an M number are respectively applied to feature maps having channels in an N number, and result images in an N×M number in total may be generated. In FIG. 6, it is illustrated that the number of the filters is 21, but this is merely an example, and the number is not limited thereto. Here, the pooling layer 620 may perform normalized cross correlation (NCC), and apply each of the filters to the feature maps.

If it is assumed that there are two images to be compared, the images should go through a normalization process before comparison, and NCC is used for this. For example, two images are indicated as f(x, y) and t(x, y), and here, x and y are coordinates of each pixel of the images, and f(x, y) and t(x, y) may mean the values of pixels located on x and y in the images. In this case, similarity between the two images may be measured through a formula (1) as below.

$$\frac{1}{n-1}\sum_{x,y} \frac{(f(x, y) - \bar{f})(t(x, y) - \bar{t})}{\sigma_f \sigma_t} \qquad \text{formula (1)}$$

Here, n refers to the total number of pixels, and $\bar{f}$ and $\bar{t}$ may mean the average values, and $\sigma_f \sigma_t$ may mean the standard deviation value of f and t.

Here, the filters may be moved on the feature maps, and an NCC value between a partial area of a feature map and a filter may be acquired. That is, as filters are applied to feature maps, an NCC result image for which an NCC value between each area of a feature map and a filter has been calculated may be acquired.

NCC result images in an M×N number acquired as above pass through the Relu and average layer 622, and feature values corresponding to each NCC result image may be acquired. Specifically, NCC result images have values from −1 to +1, and when a Relu function is applied to them, they are converted to values from 0 to 1. The electronic apparatus may acquire an average value for each NCC image by using the number of pixels having values greater than 0, and the values. Each average value represents similarity between each feature map and each filter, and by this, the electronic apparatus may acquire a feature vector in a fixed size (N×M). In FIG. 6, it is illustrated that a separate Relu and average layer is provided for each filter. However, in actual implementation, a feature value corresponding to a feature map to which each filter has been applied may be acquired through a Relu and average layer.

Then, the electronic apparatus may perform image processing by inputting the acquired feature vector to the FC layer 630. Specifically, the electronic apparatus may input the acquired feature vector to the FC layer 630, and improve the image quality of the input image 10, or extract objects included in the input image 10 or classify the types of the extracted objects depending on the purpose of the artificial intelligence model, and acquire a result thereof.

As described above, a pooling operation is performed by using an NCC technology, and accordingly, there are effects that extraction of features is not influenced by the size of an input image, there is no reduction in the resolution according to resizing of an image, the performance of an artificial intelligence model is improved as filters are learned, and extraction of features is strong against noise, change of a scale, and transformation of an image.

Figure 7:
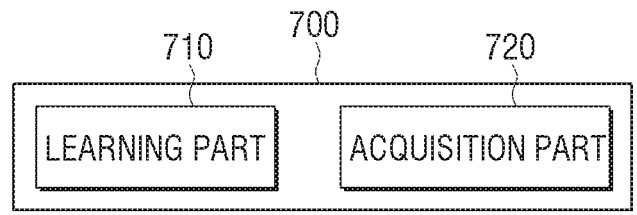
FIG. 7 is a block diagram illustrating a configuration of an electronic apparatus for learning and using an artificial intelligence model according to an embodiment of the disclosure.

FIG. 7 is a block diagram illustrating a configuration of an electronic apparatus for learning and using an artificial intelligence model according to an embodiment of the disclosure.

Referring to FIG. 7, the processor 700 may include at least one of a learning part 710 or an acquisition part 720. The processor 700 in FIG. 7 may correspond to the processor 120 in FIG. 2.

The learning part 710 may generate or train a model for generating a filter to be applied to a feature map. Also, the learning part 710 may generate an artificial intelligence model for generating a filter to be applied to a feature map in a pooling step by using the collected learning data. Further, the learning part 710 may generate a trained model having a standard for generation of a filter to be applied to a feature map by using the collected learning data. The learning part 710 as above may correspond to a training set of an artificial intelligence model.

As an example, the learning part 710 may generate, train, or update a model for predicting generation of a filter by using data for an input image as input data. Specifically, according to the purpose of a model, if the purpose is improvement of image quality, the learning part 710 may generate, train, or update a model for generating a filter to be applied to a feature map by using an input image and a high quality image corresponding to the input image. Meanwhile, if the purpose of a model is extraction or classification of objects included in an image, the learning part 710 may generate, train, or update a model for generating a filter to be applied to a feature map by using information on objects and the types of objects.

The acquisition part 720 may acquire various types of information by using specific data as input data of a trained model.

As an example, if an image is input afterwards, the acquisition part 720 may acquire (or, recognize, estimate, infer) information on the input image by using the input image and a learned filter.

At least a portion of the learning part 710 and at least a portion of the acquisition part 720 may be implemented as a software module or in the form of at least one hardware chip, and installed on an electronic apparatus. For example, at least one of the learning part 710 or the acquisition part 720 may be manufactured in the form of a dedicated hardware chip for artificial intelligence (AI), or as a portion of a conventional generic-purpose processor (e.g., a CPU or an application processor) or a graphic-dedicated processor (e.g.: a GPU), and installed on the aforementioned various types of electronic apparatuses. Here, a dedicated hardware chip for artificial intelligence is a dedicated processor specialized in probability operations, and it has higher performance in parallel processing than conventional generic-purpose processors, and is capable of processing operation works swiftly in the field of artificial intelligence like machine learning. In case the learning part 710 and the acquisition part 720 are implemented as a software module (or, a program module including instructions), the software module may be stored in anon-transitory computer readable medium. In this case, the software module may be provided by an operating system (OS), or a specific application. Alternatively, a portion of the software module may be provided by an operating system (OS), and the other portions may be provided by a specific application.

In this case, the learning part 710 and the acquisition part 720 may be installed on one electronic apparatus like a server, or respectively installed on separate electronic apparatuses. For example, one of the learning part 710 and the acquisition part 720 may be included in an electronic apparatus like a TV, and the other one may be included in an external server. Also, the learning part 710 and the acquisition part 720 are connected to each other through wire or wirelessly, and model information constructed by the learning part 710 may be provided to the acquisition part 720, and data input to the acquisition part 720 may be provided to the learning part 710 as additional learning data.

Figure 8:
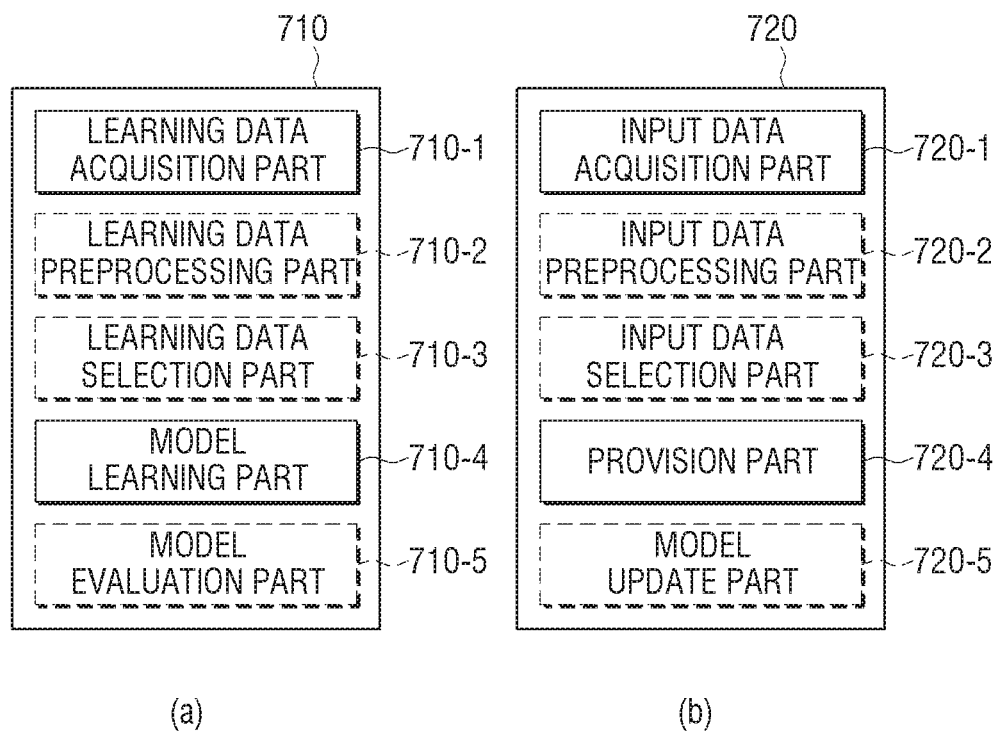
FIG. 8 is a block diagram illustrating detailed configurations of a learning part and an acquisition part according to an embodiment of the disclosure.

FIG. 8 is a block diagram illustrating detailed configurations of a learning part and an acquisition part according to an embodiment of the disclosure.

Referring to (A) of FIG. 8, the learning part 710 according to some embodiments may include a learning data acquisition part 710-1 and a model learning part 710-4. Also, the learning part 710 may selectively further include at least one of a learning data preprocessing part 710-2, a learning data selection part 710-3, or a model evaluation part 710-5.

The learning data acquisition part 710-1 may acquire learning data necessary for a model. According to an embodiment of the disclosure, the learning data acquisition part 710-1 may acquire data for an input image, etc. as learning data. Specifically, the learning data acquisition part 710-1 may acquire information on an input image, a high quality image for the input image, and the positions, number, and types of objects included in the input image, etc. as learning data.

The model learning part 710-4 may train an artificial intelligence model regarding how to correct a difference between a result of image processing acquired by using learning data and information on an actual input image. For example, the model learning part 710-4 may train an artificial intelligence model through supervised learning using at least a portion of learning data as a standard for determination. Alternatively, the model learning part 710-4 may train an artificial intelligence model, for example, through unsupervised learning of finding a standard for determination for determining a situation by self-learning using learning data without any supervision. In addition, the model learning part 710-4 may train an artificial intelligence model, for example, through reinforcement learning of using a feedback on whether a result of determination of a situation according to learning is correct. Also, the model learning part 710-4 may train an artificial intelligence model, for example, by using a learning algorithm including error back-propagation or gradient descent, etc.

When an artificial intelligence model is trained, the model learning part 710-4 may store the trained artificial intelligence model. In this case, the model learning part 710-4 may store the trained artificial intelligence model in a server (e.g., an artificial intelligence server). Alternatively, the model learning part 710-4 may store the trained artificial intelligence model in a memory of an air conditioning device connected with a server through wire or wirelessly.

The learning data preprocessing part 710-2 may preprocess acquired data such that the acquired data can be used in learning for generation of filters to be applied to a plurality of feature maps. Also, the learning data preprocessing part 710-2 may process the acquired data in a predetermined format such that the model learning part 710-4 can use the acquired data for learning for generation of filters to be applied to feature maps.

The learning data selection part 710-3 may select data necessary for learning between data acquired at the learning data acquisition part 710-1 and data preprocessed at the learning data preprocessing part 710-2. The selected learning data may be provided to the model learning part 710-4. Also, the learning data selection part 710-3 may select learning data necessary for learning among the acquired or preprocessed data according to a predetermined standard for selection. In addition, the learning data selection part 710-3 may select learning data according to a standard for selection that was determined in advance by learning by the model learning part 710-4.

The learning part 710 may further include a model evaluation part 710-5 for improving a recognition result of an artificial intelligence model.

The model evaluation part 710-5 may input evaluation data to an artificial intelligence model, and in case a recognition result output from the evaluation data does not satisfy a predetermined standard, may make the model learning part 710-4 learn again. In this case, the evaluation data may be predefined data for evaluating an artificial intelligence model.

For example, in case the number or ratio of evaluation data of which recognition result is not correct, among the recognition results of a trained artificial intelligence model for evaluation data, exceeds a predetermined threshold, the model evaluation part 710-5 may evaluate that a predetermined standard was not satisfied.

Meanwhile, in case there are a plurality of trained artificial intelligence models, the model evaluation part 710-5 may evaluate with respect to each of the trained artificial intelligence models whether it satisfies a predetermined standard, and determine a model satisfying a predetermined standard as a final artificial intelligence model. In this case, if there are a plurality of models satisfying a predetermined standard, the model evaluation part 710-5 may determine a model or models in a predetermined number set in advance in the order of having a higher evaluation score as final artificial intelligence models.

Referring to (B) of FIG. 8, the acquisition part 720 according to some embodiments may include an input data acquisition part 720-1 and a provision part 720-4.

Also, the acquisition part 720 may selectively further include at least one of an input data preprocessing part 720-2, an input data selection part 720-3, or a model update part 720-5.

The input data acquisition part 720-1 may acquire feature maps of an input image, and acquire a plurality filters according to the purpose of image processing. The provision part 720-4 may apply the input data acquired at the input data acquisition part 720-1 to an artificial intelligence model trained with an input value and acquire a result of processing the input image. The provision part 720-4 may acquire a result of processing the input image by applying data selected by the input data preprocessing part 720-2 or the input data selection part 720-3 that will be described below to the artificial intelligence model as an input value.

As an example, the provision part 720-4 may acquire (or, estimate) a result of processing an input image by applying an input image acquired at the input data acquisition part 720-1 and filters applied to the feature maps of the input image to a trained model.

Meanwhile, the acquisition part 720 may further include the input data preprocessing part 720-2 and the input data selection part 720-3, for improving a recognition result of an artificial intelligence model, or saving resources or time for providing a recognition result.

The input data preprocessing part 720-2 may preprocess the acquired data such that the acquired data can be used for being input to a first model and a second model. Also, the input data preprocessing part 720-2 may process the acquired data in a predefined format, such that the provision part 720-4 can use the acquired data for removing noise of the input image.

The input data selection part 720-3 may select data necessary for determination of a situation between data acquired at the input data acquisition part 720-1 and data preprocessed at the input data preprocessing part 720-2. The selected data may be provided to the provision part 720-4. Also, the input data selection part 720-3 may select some or all of the acquired or preprocessed data according to a predetermined standard for selection for determination of a situation. Also, the input data selection part 720-3 may select data according to a standard for selection that was determined in advance by learning by the model learning part 710-4.

The model update part 720-5 may control the artificial intelligence model to be updated based on evaluation of a recognition result provided by the provision part 720-4. For example, the model update part 720-5 may request the model learning part 710-4 to additionally train or update the artificial intelligence model by providing a result of image processing provided by the provision part 720-4 to the model learning part 710-4.

Figure 9:
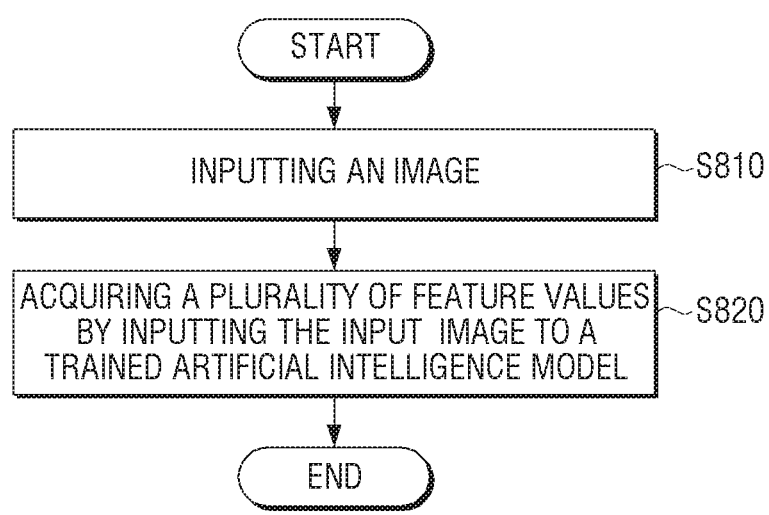
FIG. 9 is a flow chart for illustrating a method for processing an image according to an embodiment of the disclosure.

FIG. 9 is a flow chart for illustrating a method for processing an image according to an embodiment of the disclosure.

Referring to FIG. 9, first, the electronic apparatus may receive input of an image at operation S810. Specifically, an image may be received from an external apparatus, and may have been selected by a user among a plurality of images stored in the electronic apparatus.

Then, the electronic apparatus may acquire a plurality of feature values by inputting the input image to a trained artificial intelligence model at operation S820. Specifically, the trained artificial intelligence model may include a convolution layer, a pooling layer, and an FC layer.

As the image is input to a convolution layer, a plurality of feature maps for the image may be acquired. Then, the plurality of feature maps are input to a pooling layer, and a feature vector in a fixed size may be acquired. Specifically, each of a plurality of filters included in the pooling layer may be applied to each of the plurality of feature maps, and a plurality of NCC result images may be acquired. For example, if the plurality of feature maps are constructed in channels in an N number, and there are filters in an M number, there may be NCC result images in an M×N number. Afterwards, the acquired NCC result images may be input to a Relu and average layer, and feature values for each NCC result image may be acquired. That is, feature values in an M×N number may be acquired, and the number may be identical to the feature vector. Therefore, a user may designate the number of filters in consideration of a predetermined feature vector according to the purpose of image processing.

Also, the electronic apparatus may acquire a result of image processing by inputting the acquired feature values to an FC layer, although this is not illustrated in the drawing. Here, if the electronic apparatus is a display apparatus like a TV, it may display the acquired result of image processing. For example, if it is assumed that a home shopping channel is being viewed, the electronic apparatus may recognize and classify objects that appear on the screen of the home shopping channel, and display information in this regard.

Meanwhile, if the electronic apparatus is a server connected to a separate display apparatus, the electronic apparatus may transmit the result of recognition and classification of the objects that appear on the screen of the home shopping channel to the display apparatus, such that the result is displayed on the display apparatus.

As described above, by acquiring feature values in a predetermined number by applying each of a plurality of filters to a plurality of feature maps for an input image, a CNN technology becomes applicable regardless of the size of the input image.

FIG. 10 is a flow chart for illustrating a method for processing an image according to another embodiment of the disclosure. Specifically, FIG. 10 illustrates an embodiment wherein the electronic apparatus 100 is a server, and the electronic apparatus 100 may communicate with a separate display apparatus like a TV.

Referring to FIG. 10, first, the display apparatus 200 may transmit an image to the electronic apparatus 100 at operation S910. Here, in FIG. 10, it is illustrated that the electronic apparatus 100 receives an image from the display apparatus 200, but an image may be input from a content source separate from the display apparatus 200, such as a server of a broadcasting station.

Then, the electronic apparatus 100 may acquire a plurality of feature values for the input image at operation S920. Here, the plurality of feature values may be feature values in a number and a type determined according to the purpose of image processing.

Then, the electronic apparatus 100 may classify objects included in the image at operation S930. Specifically, the electronic apparatus 100 may classify the types of objects included in the input image based on the plurality of acquired feature values. Meanwhile, in FIG. 10, image processing of classifying types of objects is illustrated as an embodiment, but in actual implementation, acquisition of feature values and image processing may be performed according to various purposes such as improvement of the image quality of an input image, extraction of objects included in an input image, etc.

Further, a result of image processing may be transmitted to the display apparatus 200 at operation S940.

Then, the display apparatus 200 may display a screen based on the received result at operation S950. Specifically, if the purpose of image processing is improvement of the image quality of an image, the display apparatus 200 may display a high quality image of which image quality has been improved. Meanwhile, if the purpose of image processing is extraction of objects included in an input image, the display apparatus 200 may display a screen displaying at least one object included in the input image on the display. Meanwhile, if the purpose of image processing is classification of objects included in an input image, the display apparatus 200 may display a result indicating the types of at least one object included in the image together. For example, if an object included in an image is a dog, the display apparatus 200 may display a content that the object included in the image is a dog, and a result of analyzing the breed and age, etc. of the dog together.

According to the various embodiments described above, by acquiring feature values in a predetermined number by applying each of a plurality of filters to a plurality of feature maps for an input image, a CNN technology becomes applicable regardless of the size of the input image. Also, as filters are learned, performance can be improved.

Meanwhile, the various embodiments described above may be implemented in a recording medium that can be read by a computer or an apparatus similar to a computer, by using software, hardware, or a combination thereof. In some cases, the embodiments described in the disclosure may be implemented by using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions. In some cases, the embodiments described in this specification may be implemented as the processor 120 by itself. Also, according to implementation by software, the embodiments such as procedures and functions described in this specification may be implemented as separate software modules. Each of the software modules may perform one or more functions and operations described in this specification.

Meanwhile, methods according to the aforementioned various embodiments of the disclosure may be stored in a non-transitory readable medium. Such a non-transitory readable medium may be used while being mounted on various apparatuses.

A non-transitory readable medium refers to a medium that stores data semi-permanently, and is readable by machines, but not a medium that stores data for a short moment such as a register, a cache, and a memory. Specifically, programs for performing the aforementioned various methods may be provided while being stored in a non-transitory readable medium such as a CD, a DVD, a hard disc, a blue-ray disc, a USB, a memory card, a ROM, etc.

According to an embodiment of the disclosure, methods according to the various embodiments disclosed in this specification may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, or the memory of the relay server at least temporarily, or may be generated temporarily.

While embodiments of the disclosure have been shown and described so far, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
   a memory storing a trained artificial intelligence model including a pooling layer having a plurality of filters, a number of the plurality of filters being M; and
   a processor configured to use the trained artificial intelligence model to:
      obtain a plurality of feature maps from an input image, a number of the plurality of feature maps being N, and
      identify a plurality of feature values of the input image by applying the plurality of filters of the pooling layer to an entire area of the obtained plurality of feature maps of the input image regardless of a size of the input image, the plurality of filters being defined by learning,
      wherein the applying of the plurality of filters according to the learning includes, as the plurality of filters are being moved on the plurality of feature maps of the input image, acquiring resultant images in an M × N number for which a normalized cross correlation value representative of a partial area of the plurality of feature maps to which a filter among the plurality of filters is applied, and
      wherein the plurality of feature values are obtained from each resultant image.

2. The electronic apparatus of claim 1,
   wherein each filter of the plurality of filters is applied to all of the plurality of feature maps.

3. The electronic apparatus of claim 1,
   wherein the plurality of filters of the pooling layer are updated based on the identified plurality of feature values of the input image.

4. The electronic apparatus of claim 1,
   wherein the plurality of feature values are identified based on a similarity between each of the plurality of feature maps and the plurality of filters.

5. The electronic apparatus of claim 1,
   wherein the pooling layer further includes a Relu layer through which the plurality of feature maps pass.

6. The electronic apparatus of claim 5,
   wherein the plurality of feature values are identified as average values of each of the plurality of feature maps that pass through the Relu layer.

7. The electronic apparatus of claim 1,
wherein the plurality of feature maps are obtained by using a convolution layer included in the trained artificial intelligence model.

8. The electronic apparatus of claim 1,
wherein a number of the plurality of filters is identified based on a number of the plurality of feature maps and a number of the plurality of feature values.

9. The electronic apparatus of claim 1,
wherein the processor is further configured to classify objects included in the input image based on the identified plurality of feature values.

10. A method comprising:
receiving an input image; and
using a trained artificial intelligence model to:
    obtain a plurality of feature maps from an input image, a number of the plurality of feature maps being N, and
    identify a plurality of feature values of the input image by applying a plurality of filters of a pooling layer of the trained artificial intelligence model to an entire area of the obtained plurality of feature maps of the input image regardless of a size of the input image and a number of the plurality of filters being M,
    wherein the applying of the plurality of filters according to the learning includes, as the plurality of filters are being moved on the plurality of feature maps of the input image, acquiring resultant images in an M × N number for which a normalized cross correlation value representative of a partial area of the plurality of feature maps to which a filter among the plurality of filters is applied, and
    wherein the plurality of feature values are obtained from each resultant image.

11. The method of claim 10,
wherein each filter of the plurality of filters is applied to all of the plurality of feature maps.

12. The method of claim 10,
wherein the plurality of filters of the pooling layer are updated based on the identified plurality of feature values of the input image.

13. The method of claim 10,
wherein the plurality of feature values are identified based on a similarity between each of the plurality of feature maps and the plurality of filters.

14. The method of claim 10,
wherein the pooling layer further includes a Relu layer through which the plurality of feature maps pass.

15. The method of claim 14,
wherein the plurality of feature values are identified as average values of each of the plurality of feature maps that pass through the Relu layer.

16. The method of claim 10,
wherein the plurality of feature maps are obtained by using a convolution layer included in the trained artificial intelligence model.

17. The method of claim 10,
wherein a number of the plurality of filters is identified based on a number of the plurality of feature maps and a number of the plurality of feature values.

18. The method of claim 10, further comprising:
classifying objects included in the input image based on the identified plurality of feature values.

19. The method of claim 10, further comprising comparing the input image, as a first image indicated as f(x, y), with a second image indicated as t(x, y),
    wherein x and y are coordinates of each pixel of the first image and the second image, and f(x, y) and t(x, y) are values of pixels located on x and y in the first image and the second image, and
    wherein a similarity between a normalization of the first image and the second image is measured through $$\frac{1}{n-1} \sum_{x,y} \frac{(f(x, y) - \bar{f})(t(x, y) - \bar{t})}{\sigma_f \sigma_t}$$

wherein
    n is a total number of the pixels of the first image and the second image,
    $\bar{f}$ and $\bar{t}$ are average values of the pixels of the first image and the second image, respectively, and
    $\sigma_f \sigma_t$ is a standard deviation value of f and t.

20. A non-transitory computer-readable recording medium including a program that, when executed on at least one processor, performs a method including:
receiving an input image; and
using a trained artificial intelligence model to:
    obtain a plurality of feature maps from an input image, a number of the plurality of feature maps being N, and
    identify a plurality of feature values of the input image by applying a plurality of filters of a pooling layer of the trained artificial intelligence model to an entire area of the obtained plurality of feature maps of the input image regardless of a size of the input image, the plurality of filters being defined by learning and a number of the plurality of filters being M,
    wherein the applying of the plurality of filters according to the learning includes, as the plurality of filters are being moved on the plurality of feature maps of the input image, acquiring resultant images in an M × N number for which a normalized cross correlation value representative of a partial area of the plurality of feature maps to which a filter among the plurality of filters is applied, and
    wherein the plurality of feature values are obtained from each resultant image.

* * * * *